United States Patent
Cheng et al.

(10) Patent No.: US 10,410,150 B2
(45) Date of Patent: Sep. 10, 2019

(54) EFFICIENT COMPUTERIZED CALCULATION OF RESOURCE REALLOCATION SCHEDULING SCHEMES

(71) Applicants: Yu Cheng, Shanghai (CN); Mengjiao Wang, Shanghai (CN); Wen-Syan Li, Fremong, CA (US)

(72) Inventors: Yu Cheng, Shanghai (CN); Mengjiao Wang, Shanghai (CN); Wen-Syan Li, Fremong, CA (US)

(73) Assignee: SAP SE, Walldorf (DE)

( * ) Notice: Subject to any disclaimer, the term of this patent is extended or adjusted under 35 U.S.C. 154(b) by 875 days.

(21) Appl. No.: 14/532,330

(22) Filed: Nov. 4, 2014

(65) Prior Publication Data
US 2016/0125333 A1    May 5, 2016

(51) Int. Cl.
G06Q 10/06 (2012.01)
G06Q 10/08 (2012.01)

(52) U.S. Cl.
CPC ..... *G06Q 10/06312* (2013.01); *G06Q 10/083* (2013.01); *G06Q 10/087* (2013.01)

(58) Field of Classification Search
None
See application file for complete search history.

(56) References Cited

U.S. PATENT DOCUMENTS

| | | | |
|---|---|---|---|
| 5,630,070 A * | 5/1997 | Dietrich | G06Q 10/06 705/7.12 |
| 8,219,546 B2 | 7/2012 | Yan et al. | |
| 8,332,390 B2 | 12/2012 | Yan et al. | |
| 8,612,180 B2 | 12/2013 | Yan et al. | |
| 8,650,340 B2 | 2/2014 | Yan et al. | |
| 8,660,949 B2 | 2/2014 | Li et al. | |
| 8,744,888 B2 | 6/2014 | Li et al. | |
| 8,775,397 B2 | 7/2014 | Dong et al. | |
| 8,788,501 B2 | 7/2014 | Li et al. | |
| 2010/0318495 A1 | 12/2010 | Yan et al. | |
| 2013/0006988 A1 | 3/2013 | Li et al. | |
| 2013/0117752 A1 | 5/2013 | Li et al. | |
| 2013/0173330 A1* | 7/2013 | Puskorius | G06Q 10/00 705/7.25 |

(Continued)

OTHER PUBLICATIONS

Voluntary Interindustry Commerce Solutions Association (VICS), 'The Ultimate Retail Supply Chain Machine: Connecting the Consumer to the Factory', Version 1.1., Jan. 2013.*

(Continued)

*Primary Examiner* — Alan S Miller
*Assistant Examiner* — Arif Ullah
(74) *Attorney, Agent, or Firm* — Fish & Richardson P.C.

(57) ABSTRACT

The present disclosure relates to a computer system comprising a database including, a reallocation scheduling module, the reallocation scheduling module configured to obtain an objective function including one or more integer-valued decision variables and automatically determine a proposed reallocation scheme for each of one or more items between a plurality of locations based on the objective function, wherein determining the reallocation scheme includes finding values of one or more decision variables that optimize the objective function while obeying the one or more constraints, wherein determining a proposed reallocation scheme includes solving an integer quadratic programming problem.

17 Claims, 3 Drawing Sheets

(56) References Cited

U.S. PATENT DOCUMENTS

| | | |
|---|---|---|
| 2014/0019186 A1 | 1/2014 | Li et al. |
| 2014/0019984 A1 | 1/2014 | Li et al. |
| 2014/0101024 A1 | 4/2014 | Li et al. |
| 2014/0279662 A1 | 9/2014 | Wang et al. |
| 2015/0006292 A1* | 1/2015 | Li .................. G06Q 30/0264 705/14.61 |
| 2015/0248638 A1* | 9/2015 | Hergarten ........ G06Q 10/08355 705/335 |

OTHER PUBLICATIONS

Voluntary Interindustry Commerce Solutions Association (VICS), 'The Ultimate Retail Supply Chain Machine: Connecting the Consumer to the Factory', Version 1.1., Jan. 2013 (Year: 2013).*

* cited by examiner

EFFICIENT COMPUTERIZED CALCULATION OF RESOURCE REALLOCATION SCHEDULING SCHEMES

TECHNICAL FIELD

The present disclosure relates to methods and systems for database systems. In particular, the present disclosure relates to the computerized calculation of resource reallocation scheduling schemes.

BACKGROUND

Determining a resource reallocation scheme can be a fairly challenging task due to a potentially large and complex problem space with a large number of variables. For instance, calculating a resource reallocation scheme for a retail store chain can involve tens of thousands of product types in thousands of different locations. Even when using state-of-the art computers, it can be difficult or impossible to automatically find a solution for resource reallocation problems in an appropriate time. In particular, theoretical models being used for solving resource reallocation problems can be difficult to implement on a computer system for efficient computer-based processing.

SUMMARY

In a first general aspect of the present disclosure, a computer system comprises i) a database including information regarding a current stock of each of one or more items in each of a plurality of locations; historical data regarding a rate of decrease of a stock of each of the items in each of the plurality of locations; historical data regarding replenishments of a stock of each of the items in each of the plurality of locations; ii) a historical data analysis module, which is configured to determine average values and deviation values for the rate of decrease of the stock of each of the items in each of the plurality of locations, and determine average values and deviation values for replenishment durations of the stock of each of the items in each of the plurality of locations and iii) a reallocation scheduling module, which is configured to obtain an objective function including one or more integer-valued decision variables, a first decision variable indicating a quantity of each of the one or more items to be transported between each of the plurality of locations, where one or more terms of the objective function include the first decision variable, the current stock of one or more items in the plurality of locations, and the average values and deviation values of the rate of decrease of the stock of the items in each of the plurality of locations and replenishment durations of the stock of each of the items in each of the plurality of locations, and wherein the objective function is a quadratic function with respect to the one or more decision variables; the reallocation scheduling module further being configured to obtain one or more constraints which are linear with respect to the one or more decision variables and the reallocation scheduling module further being configured to automatically determine a proposed reallocation scheme for each of the items between the plurality of locations based on the objective function, wherein determining the reallocation scheme includes finding values of one or more decision variables that optimize the objective function while obeying the one or more constraints, wherein determining a proposed reallocation scheme includes solving an integer quadratic programming problem.

In a second aspect according to the first aspect, the objective function includes a term quantifying a benefit of a transport of a first item of the one or more items from a first location of the plurality of locations to a second location of the plurality of locations, wherein the term quantifying a benefit is determined based on a linear approximation of a nonlinear function determining an incremental benefit per unit of the first item transported from the first location to the second location.

In a third aspect according to the second aspect, the benefit is determined based on a cumulative value calculated based on the linear approximation of a nonlinear function determining an incremental benefit per unit of the first item transported from the first location to the second location.

In a fourth aspect according to any one of the second to third aspects, the nonlinear function determining an incremental benefit per unit of the first item includes a first section of constant incremental benefit per unit and a second section with a nonlinearly decreasing incremental benefit per unit.

In a fifth aspect according to the fourth aspect, the boundary between the first section and the second section is determined based on an average value of a rate of decrease of a stock of the first item at the second location and based on a replenishment duration of the stock of the first item at the second location.

In a sixth aspect according to the fourth or fifth aspect, the linear approximation includes approximating the nonlinear function by a linear function, wherein the linear function crosses the nonlinear function at the boundary between the first section and wherein the linear function yields an incremental benefit of zero for a predetermined number of transported items, the predetermined number of items being higher than an average value of the rate of decrease of the stock of the first item at the second location multiplied with the replenishment duration of the stock of the first item at the second location by a predetermined amount.

In a seventh aspect according to the sixth aspect, the predetermined amount is determined based on the deviation of the rate of decrease of the stock of the first item at the second location and a deviation of the replenishment duration of the stock of the first item at the second location.

In an eighth aspect according to any one of the second to seventh aspects, the objective function further includes a term quantifying the cost of a transport of the first item from the first location to the second location of the plurality of locations.

In a ninth aspect according to the eighth aspect, the term quantifying the cost is determined based at least on a cost of transport per unit between the first location and the second location and a number of transport vehicles required to transport a particular number of first items from the first location to the second location In a tenth aspect according to any one of the preceding aspects, a first constraint of the one or more constraints is that a number of items of a first item transported from a first location of the one or more locations to a second location of the one or more locations shall not exceed a required quantity of the first item at the second location.

In an eleventh aspect according to any one of the preceding aspects, the computer system further comprises a future requirement analysis module, wherein the future requirement analysis module is configured to determine a required quantity of a particular item at a particular location based on the current stock of the particular item at the particular location and average values and deviation values for the rate of decrease of the stock of the particular item at the particular location and replenishment durations of the stock of the particular item at the particular location.

In a twelfth aspect according to the eleventh aspect, a required quantity of the particular item at the particular location is calculated as a minimum required quantity minus a current stock of the particular item.

In a thirteenth aspect according to the twelfth aspect, the minimum required quantity is determined based on an average value of a rate of decrease of the stock of the first item at the second location multiplied with the replenishment duration of the stock of the first item at the second location plus an amount which is determined based on the deviation of the rate of decrease of the stock of the first item at the second location and a deviation of the replenishment duration of the stock of the first item at the second location.

In a fourteenth aspect according to any one of the preceding aspects, a second constraint of the one or more constraints is that a number of items of a first item transported from a first location of the one or more locations to a second location of the one or more locations shall not exceed a capacity for the first item at the second location.

In a fifteenth aspect according to any one of the preceding aspects, a third constraint of the one or more constraints is that a number of vehicles required to transport a quantity of first items from a first location of the one or more locations to a second location of the one or more locations shall not exceed an available number of vehicles at the first location.

In a sixteenth aspect according to any one of the preceding aspects, determining average values and deviation values for the rate of decrease of the stock of each of the items in each of the plurality of locations and replenishment durations of the stock of each of the items in each of the plurality of locations includes approximating historical data regarding a rate of decrease of a stock of each of the items in each of the plurality of locations and historical data regarding replenishments of a stock of each of the items in each of the plurality of locations by normal distributions In a seventeenth aspect according to any one of the preceding aspects, the average values are arithmetic means and the deviation values are standard deviations.

In an eighteenth aspect according to any one of the preceding aspects, terms of the objective function are further determined based on a price of each of the items.

In a second general aspect of the present disclosure a computer-implemented method comprises determining average values and deviation values for a rate of decrease of a stock of each item of one or more items in each of a plurality of locations and replenishment durations of the stock of each of the items in each of the plurality of locations; determining a proposed reallocation scheme for each of the items between the plurality of locations, wherein determining the reallocation scheme includes finding values of one or more decision variables such that an objective function is optimized, wherein a first decision variable indicates a quantity of each of the one or more items to be transported between each of the plurality of locations, and wherein terms of the objective function include the first decision variable, the current stock of one or more items in the plurality of locations and the average values and deviation values of the rate of decrease of the stock of the items in each of the plurality of locations and replenishment durations of the stock of each of the items in each of the plurality of locations such that a problem of optimizing the objective function is an integer quadratic programming problem In a third general aspect of the present disclosure a computer-readable medium stores instructions thereon which when executed by a computer system cause the computer system to carry out the operations of any one of the methods of the first to eighteenth aspects.

DETAILED DESCRIPTION

Figure 1:
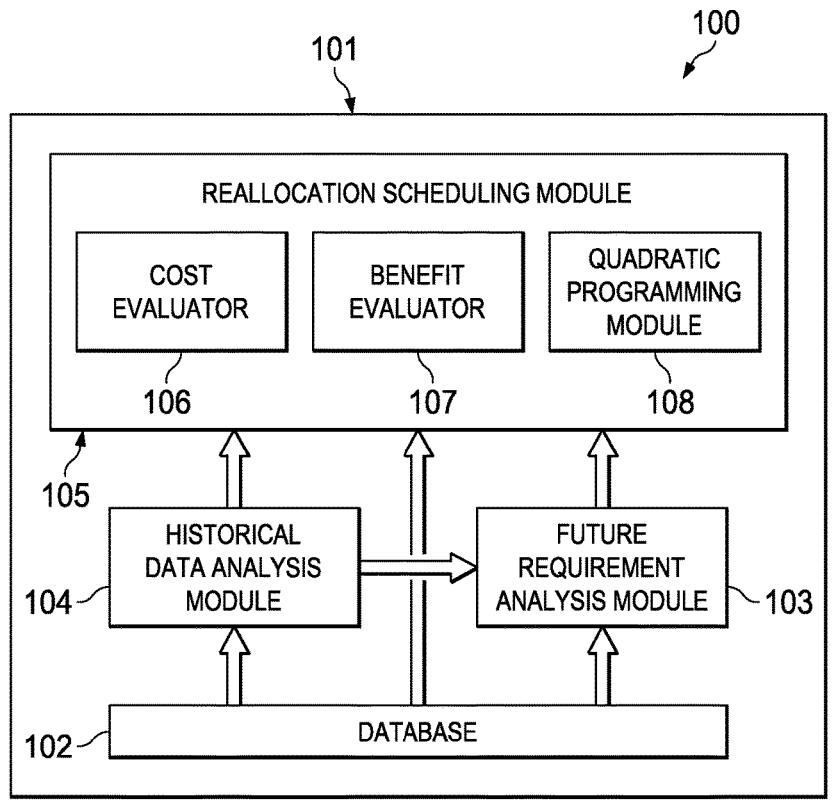
FIG. 1 illustrates an example computer system for computerized calculation of resource reallocation scheduling schemes.

The present disclosure relates to methods and systems for database systems. In particular, the present disclosure relates to the computerized calculation of resource reallocation scheduling schemes.

The subject matter described in this disclosure can be implemented in particular embodiments so as to realize one or more of the following advantages:

First, the resource reallocation scheduling schemes can be implemented efficiently on a computer system. This means particular theoretical models for resource reallocation scheduling have been adapted to be (relatively) easily implementable on a computer system and solvable in a (relatively) time- and resource-efficient manner.

Second, the resource reallocation scheduling schemes can be solved by using integer linear programming techniques which can save computational resources and/or can be done more time efficiently than when using other techniques for computerized processing of resource reallocation scheduling schemes.

Subsequently, an example computer system for the computerized calculation of resource reallocation scheduling schemes will be discussed in connection with FIG. 1. In connection with FIG. 2, FIG. 3 and FIG. 4, several aspects of an example method for calculation of resource reallocation scheduling schemes particularly adapted to be processed by a computer will be explained. Last, in connection with FIG. 5, different aspects of an example method for computerized calculation of resource reallocation scheduling schemes will be described.

In the methods and systems of the present disclosure herein, a resource reallocation scheduling scheme is determined by finding decision variables which maximize an objective function. In the present disclosure, "decision variables" are the variables within a model that one can control.

The models described herein are particularly adapted to be computer-solvable by solving an integer quadratic programming problem. This means that an objective function which has to be optimized (i.e., maximized or minimized) contains in each term at most a quadratic expression of one or more decision variables. In other words, a term includes each decision variable either squared ($2^{nd}$ order), or the term is linear in the decision variable ($1^{st}$ order), or the term does not include the decision variable at all ($0^{th}$ order). The terms neither include higher-order expressions of the decision variables, nor a decision variable in a non-integer exponential, nor any other non-linear expression of the decision variable. A term might be linear in two different decision variables. For instance, if the decision variables are labeled "x", "y," and "z," and "a" is an arbitrary constant, the terms might have one of the following forms: "a," "a·x," "a·x$^2$," "a·y," "a·y$^2$," "a·z," "a·z$^2$," "a·x·y," "a·x·z," or "a·y·z." The terms might not have, e.g., one of the following forms: "a·x$^3$," "1/x," or "cos(ax)."

In addition, the one or more constraints of the integer quadratic programming problem are at most linear in the decision variables. In other words, constraints are either linear in a decision variable (1$^{st}$ order) or do not include the decision variable (0$^{th}$ order). A constraint can be an equation or a relation (e.g., "a>x" or "b<z").

Last, the decision variables are integer-valued variables. The decision variables might be expressed as a vector, where each component of the vector indicates an integer number. For example, a decision can indicate a number (integer valued) of a particular product to be shipped from a first location to a second location. A second decision variable might indicate a number (integer valued) of vehicles at each location.

In the subsequent passages, the systems and methods for the computerized calculation of resource reallocation scheduling schemes will be discussed based on the example of a chain of retail stores and a plurality of products to be reallocated between the different stores at different locations. However, the systems and methods described herein are not limited to reallocating products between retail stores. Rather, the systems and methods described herein can be employed whenever countable objects or subjects have to be reallocated between different locations. For instance, the systems and methods described herein could be used to determine a reallocation scheme for cars between train stations. In other examples, the systems and methods described herein can be used to determine a reallocation scheme for waiters between different restaurants, medical professionals between different hospitals, or trainers between different gyms. In other examples, the systems and methods described herein can be used to determine a reallocation scheme for machines or tools between different manufacturing locations of a company.

FIG. 1 depicts different components of an example computer system for the computerized calculation of resource reallocation scheduling schemes 100. The example system of FIG. 1 includes a database 102, a historical data analysis module 194, a future requirement analysis module 103, and a reallocation scheduling module 105. The different modules refer to functional units of the example computer system for the computerized calculation of resource reallocation scheduling schemes 100. This does not mean that a concrete implementation of the example computer system for the computerized calculation of resource reallocation scheduling schemes 100 must have different components corresponding to the modules depicted in FIG. 1. Rather, it is only necessary that the concrete implementation is configured to perform the functions of the different modules. Details with respect to hardware and software implementation of the modules depicted in FIG. 1 are discussed below. The operation and optional aspects of the components of FIG. 1 will be explained in more detail subsequently.

In the example of FIG. 1, the database includes data to be used by the computer system for the computerized calculation of resource reallocation scheduling schemes 100 to calculate the reallocation scheme. For instance, the database 102 might include information regarding a current stock of each of one or more items in each of a plurality of locations, historical data regarding a rate of decrease of a stock of each of the items in each of the plurality of locations, and historical data regarding replenishments of a stock of each of the items in each of the plurality of locations. In the current example, each location corresponds to a particular retail store of the retail store chain. Each item corresponds to a product to be sold in the retail stores. The historical data regarding a rate of decrease of a stock of each of the items in each of the plurality of locations and historical data regarding replenishments of a stock of each of the items in each of the plurality of locations corresponds to a number of sold items per time and a number of replenished items per time in the past.

In addition, the database 102 can include information regarding the particular retail store. For instance, the database 102 can include a unique identifier for each store and a current price for each item sold at the particular retail store. In addition, the information regarding the particular retail store can include geographical information regarding the retail store's location and information regarding a storage capacity for a particular product (or multiple products) of the retail store.

The information regarding a current stock of each of one or more items can identify a quantity of the product in the inventory of each retail store. The historical data regarding replenishments can identify for a plurality of past replenishments a point in time (e.g., a date or a time of the day) when the replenishment was requested. Moreover, the historical data regarding replenishments can identify for the plurality of past replenishments a point in time (e.g., a date or a time of the day) when the replenishment was completed. Again, the historical data regarding replenishment can be on a per-product level. The historical data regarding replenishments can include all or a selection of replenishments in a particular time period. For instance, the time period can be a moving window dating back a predetermined time span from the present day (e.g., one year).

The historical data regarding a rate of decrease of a stock of each of the items in each of the plurality of locations can identify sales of the products per time period. In one example, the historical data regarding a rate of decrease can include daily sales records including the amount of sales for each product per day. In another example, the historical data regarding a rate of decrease can list each sale with an associated time stamp. In any case, the historical data regarding a rate of decrease includes information regarding sales per time on a per-product basis.

The data included in the database 102 can be provided to the different modules of the computer system for the computerized calculation of resource reallocation scheduling schemes 100. These modules will be discussed in more detail in the subsequent sections.

The historical data analysis module 104 will be described first. This module is configured to analyze the historical data to determine particular characteristics of the historical data. The historical data analysis module can provide these characteristics to the future requirement analysis module 103 and/or the reallocation scheduling module 105 to be further processed.

In one example, the historical data analysis module 104 can determine information regarding the minimum required stock and a safety inventory level of each product in the retail store. This can involve determining statistical characteristics of a lead time of each product, where the expression "lead time" refers to a time span between a request of a replenishment of a particular product and a completion of the replenishment of a particular product at a particular retail store. Furthermore, this can involve determining statistical characteristics of sales data for each product at a particular store. The data required to calculate these statistical characteristics can be retrieved from the database 102.

In one example, the historical data analysis module 104 can be configured to make the assumption that the lead times and the sales data are normally distributed. However, in other examples, historical data analysis module 104 can be configured to make the assumption that the lead times and the sales data are distributed according to another statistical distribution. If a normal distribution is assumed, the distribution of lead times and sales of a particular product at a particular retail store can be characterized by an arithmetic average and a standard deviation of the lead times and the sales of a particular product at a particular retail store. Based on this data, the historical data analysis module 104 can determine the minimum required stock and a safety inventory level of each product in the retail store.

In one example, the historical data analysis module 104 can be configured to determine the minimum required stock and a safety inventory of each product in the retail store as follows. The minimum required stock can be determined to be a product of the historical sales per time period (e.g., a number of sales per day) for a particular product times the historical lead time for that product at a particular shop. This can be expressed as:

$$\text{MinQuaReq} = \text{DailySale} * \text{LeadTime}, \quad \text{Equation (1)}$$

where the variable "MinQuaReq" denotes the minimum required stock of a particular product at a particular retail store, "DailySale" denotes a number of past sales per day of a particular product at the retail store, and "LeadTime" denotes the historical lead time for the particular product at the particular shop.

In one example, the historical data analysis module 104 can be configured to treat the number of sales per time period and the lead time as statistical variables. As a consequence, the minimum required stock of a particular product at a particular retail store being a product of two statistical variables can also be treated as a statistical variable. If the sales per time period and the lead time are assumed to be normally distributed, the minimum required stock will also be a normally distributed probability variable over a number of units.

Figure 2:
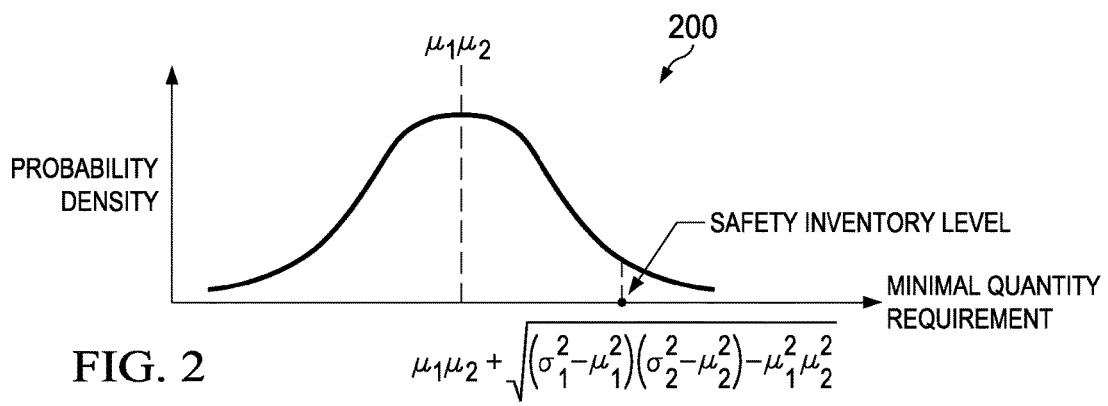
FIG. 2 illustrates a probability distribution curve for assessing a minimal requirement of a resource.

FIG. 2 illustrates a probability density of the probability variable "minimum required stock." The x-axis denotes a number of units in stock of a particular product, the y-axis denotes a probability that a particular number of units will meet a future requirement. As can be seen, the probability is highest at a number of units in stock which corresponds to the average sales per day (denoted as $\mu_1$) times the average lead time (denoted as $\mu_2$). This is the case as it has been assumed that the sales per time and the lead time are normally distributed. This means that the probability is highest at the lead time and the sales per day have their average value. As a consequence, the product of the sales per day and the lead time is highest at the average sales per day times the average lead time (i.e., $\mu_1$ times $\mu_2$).

As can be seen in FIG. 2, the probability declines exponentially on both sides of the maximum. Therefore, the probability that a stock much smaller than the average sales per day times the average lead time will meet the requirements for the particular product of the particular retail store is low. Rather, it is probable that the retail store will run out of that product before it can be replenished. In the same manner, the probability that a stock much larger than the average sales per day times the average lead time will meet the requirements for the particular product of the particular retail store is low. More likely, the retail store will have too many of those products in stock.

In one illustrative example, a sport shoe of a particular type is sold in average fifteen times a day in a particular retail store. In addition, the lead time for the replenishment of this shoe from a distribution center is three days. This means that a minimum required stock for this sport shoe at the particular shop is 45 units according to equation 1.

In addition or alternatively, the historical data analysis module 104 can be configured to determine a safety inventory level for a particular product at a particular retail store. The historical data analysis module 104 can perform this task based on a variation of the sales per time and the lead times in the past. In one example, if the sales per time and the lead times are assumed to be normally distributed, a safety inventory level can be determined as:

$$\text{SafeInv} = \mu_1\mu_2 + \sqrt{(\sigma_1^2 - \mu_1^2)(\sigma_2^2 - \mu_2^2)} + \mu_1\mu_2, \quad \text{Equation (2)}$$

where the variable "SafeInv" denotes a safety inventory level of a particular product at a particular retail store, "$\sigma_1$" denotes the standard deviation of the sales per day, and "$\sigma_2$" denotes the standard deviation of the lead time.

The meaning of the variable "safety inventory level" can again be explained in connection with FIG. 2. As already explained, the probability that a stock of $\mu_1\mu_2$ will suffice to meet the future requirements can be maximal. Nevertheless, in approximately 50% of the cases, a higher number of units of the particular product will be required to meet the requirements of the shop (in case if the requirement is "on the right hand side" of the average requirement). Therefore, a safety inventory level can be higher than the average required inventory level. As can be seen in FIG. 2 and equation 2, the amount by which the safety inventory level exceeds the average required inventory level can be determined based on a statistical deviation of the sales per time and the lead time. In the example of FIG. 2, the safety inventory level is one standard deviation higher than the average inventory level. In other examples, the safety inventory level can be more than one standard deviation higher or less than one standard deviation higher (but still higher) than the average inventory level. A higher safety inventory level will decrease the likelihood of the product running out of stock (but, on the other hand, will increase the likelihood that the shop will overstock the particular product). This safety margin can be user determined.

In the illustrative sport shoe example above, a standard deviation of the lead time might be 0.5 days and a standard deviation of the sales per day 5 items. Then, a safety inventory level can be determined to be approximately 145 items by using equation 2 ($3*40 + \sqrt{(0.5^2+3^2)(5^2+40^2) - 3^2*40^2}$).

The historical data analysis module 104 can provide different characteristics of the historical data to other modules of the computer system for the computerized calculation of resource reallocation scheduling schemes 100. For example, the historical data analysis module 104 can provide average or deviation values for a lead time and average or deviation values of a number of sales per time (e.g., the characteristics described above). In addition or alternatively, the historical data analysis module 104 can provide estimates for a minimum required quantity of items and a safety level interval to other modules of the computer system for the computerized calculation of resource reallocation scheduling schemes 100.

One of these other modules is the future requirement analysis module 103, which will be discussed subsequently. This module is configured to estimate the future requirement of items at different retail stores. This data can be used to avoid shortages and overstock situations of products at different retail stores.

In one example, the future requirement analysis module 103 can determine an import requirement which quantifies a number of items which have to be transported at a particular retail store. The future requirement analysis module 103 can determine an import requirement based on a minimum required quantity of a product and a current stock of the product at a particular retail store. For instance, the future requirement analysis module 103 can use the following equation to calculate the import requirement:

$$\text{ImpReq}=\text{MinQuaReq}-\text{CurrentStock}, \quad \text{Equation (3)}$$

where the variable "ImpReq" denotes the import requirement for the product at the particular retail store, the variable "MinQuaReq" denotes the minimum required quantity for the particular product at the particular retail store (e.g., as calculated by the historical data analysis module 104 described above), and the variable "CurrentStock" denotes the current stock for the particular product at the particular retail store.

Alternatively or in addition, the future requirement analysis module 103 can determine an import requirement based on a safety inventory level of a product and a current stock of the product at a particular retail store. For instance, the future requirement analysis module 103 can use the following equation to calculate the import requirement:

$$\text{ImpReq}=\text{SafeLevel}-\text{CurrentStock}, \quad \text{Equation (4)}$$

where the variable "ImpReq" denotes the import requirement for the product at the particular retail store, the variable "SafeLevel" denotes the minimum required quantity for the particular product at the particular retail store (e.g., as calculated by the historical data analysis module 104 described above), and the variable "CurrentStock" denotes the current stock for the particular product at the particular retail store.

Alternatively or in addition, the future requirement analysis module 103 can determine an export requirement which quantifies a number of items which should be transported away from a particular retail store to avoid exceeding a storage capacity of the particular shop. The future requirement analysis module 103 can determine the export requirement based on a current stock of a product and a store capacity for the product at a particular retail store. For instance, the future requirement analysis module 103 can use the following equation to calculate the export requirement:

$$\text{ExReq}=\text{CurrentStock}-\text{Cap}, \quad \text{Equation (5)}$$

where the variable "ExReq" denotes the export requirement for the product at the particular retail store, the variable "Cap" denotes the store capacity for the particular product at the particular retail store, and the variable "CurrentStock" denotes the current stock for the particular product at the particular retail store.

The historical data analysis module 104 can provide the import requirements and the export requirements to other modules of the computer system for the computerized calculation of resource reallocation scheduling schemes 100.

Last, the reallocation scheduling module 105 will be discussed in the following paragraphs. In the example of FIG. 1, the reallocation scheduling module 105 has three engines which provide the different functions of the reallocation scheduling module 105: a cost evaluator engine 106, a benefit evaluator engine 107, and a quadratic programming engine 108. The reallocation scheduling module 105 is configured to determine a reallocation scheme for one or more items between multiple locations based on the input provided by the other modules. In the retail store chain example introduced above, the reallocation scheduling module 105 is configured to determine a reallocation scheme for a plurality of products between a plurality of retail stores of the retail store chain. However, as already mentioned, this application example is only used for the sake of illustration. The reallocation scheduling module 105 can also determine reallocation schemes for other scenarios.

The reallocation scheduling module 105 can implement a particular benefit-cost model adapted to be efficiently processable by a computer system and determine the reallocation scheduling schemes by optimizing an objective function constructed according to this model. The underlying benefit-cost model will now be discussed in connection with FIG. 3.

The upper curve shows an example benefit increase rate per unit of a particular item at a particular location underlying a benefit-cost model. In detail, the graph depicts an example benefit increase rate over a number of items of the particular product. In other words, a benefit increase rate of a future stock of the product at the location would assume a certain value. As can be seen, the x-axis is zeroed at a number of units corresponding to a current stock of the particular item. Accordingly, the points on the right-hand side of the origin of the graph denote a stock including a higher number of items than the current stock. This higher number of items in stock in the future requires moving items to the particular location. In the retail store example, products have to be shipped to a particular store. Therefore, the x-axis in FIG. 3 is labeled as "CurrentStock+Ship," i.e., a number of items currently in stock plus a number of items to be shipped.

Figure 3:
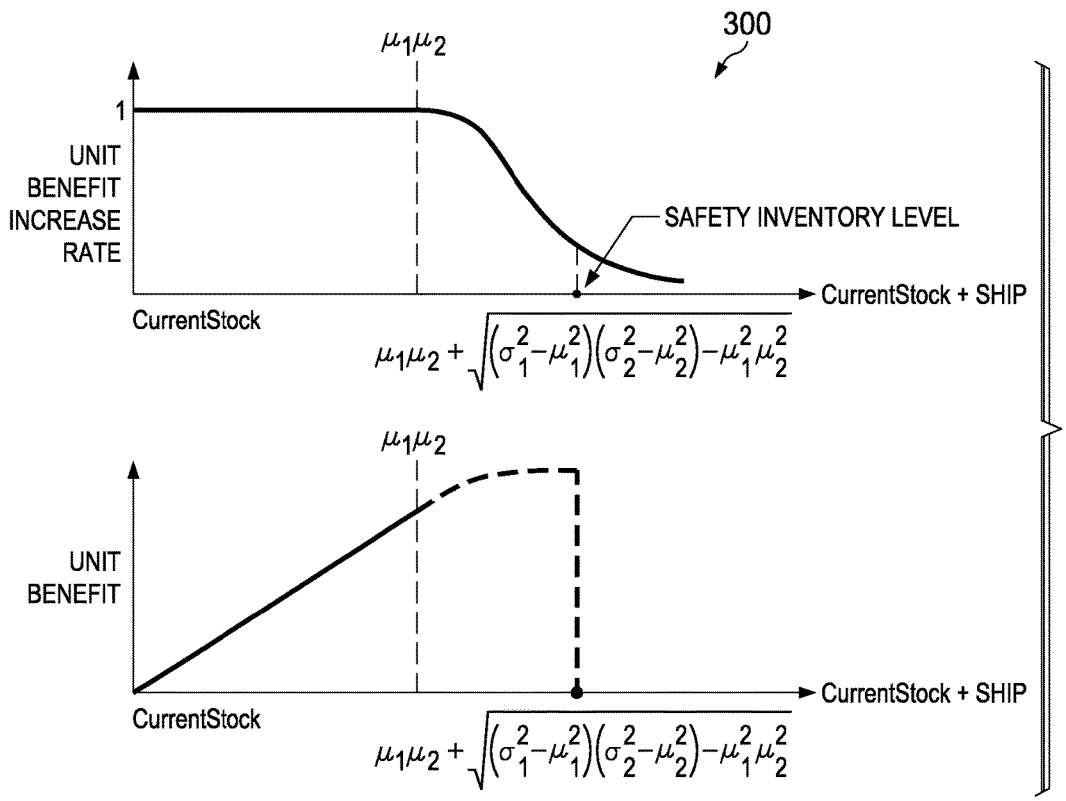
FIG. 3 illustrates an example graph indicating an increase rate of a benefit per unit and an example graph indicating a cumulated benefit per unit.

As can be seen, the benefit increase rate of FIG. 3 has two distinct regions. In a first region, a benefit increase rate increases linearly (e.g., with an increase rate of one) up to a number of items in stock ("current stock plus shipped items") which corresponds to the average required amount of items. In one example, as discussed above, this value can be calculated as the product of an average lead time and an average number of sales per time rate (i.e., $\mu_1$ times $\mu_2$). For larger current stock values, the benefit increase rate per unit drops. In one example, the shape of the curve in this region corresponds to the shape of the probability density of the quantity requirement shown in FIG. 2. That is, the benefit increase rate per unit drops exponentially and converges to zero for higher number of units in stock. In FIG. 3, a safety inventory level determined based on a deviation of the lead time and the sales rate is also indicated. In general, the model yielding the example benefit increase rate per unit of a particular item depicted in FIG. 3 reflects that the larger the (future) stock the more probable an added unit will not be required. Therefore, this added unit adds a lower benefit than a unit that will most likely (or at least more likely) be required.

The lower curve of FIG. 3 shows a total benefit per unit in stock. This curve can be obtained by integrating (or summing up) the benefit increase rate of the upper curve of FIG. 3 up to a respective number of units. As a consequence, the total benefit increases linearly (as long as the benefit increase rate is constant) in a first region and then saturates as the benefit increase rate approaches zero.

Having said that, a benefit of shipping an item of a particular product to a particular shop can be calculated based in the following way:

$$\text{Benefit} = \text{Price} * \text{ImpReg}, \qquad \text{Equation (6a)}$$

if a number of items currently in stock plus a number of items shipped is smaller or equal than $\mu_1$ times $\mu_2$, and $$\text{Benefit} = \qquad \text{Equation (6b)}$$

$$\left\{ \text{Price} * \left( \mu_1\mu_2 + \frac{1}{\sqrt{2\pi(\sigma_1^2 - \mu_1^2)(\sigma_2^2 - \mu_2^2) - \mu_1\mu_2}} * \sum_{i=\mu_1\mu_2}^{I} \exp\left( -\frac{(i - \mu_1\mu_2)^2}{2((\sigma_1^2 - \mu_1^2)(\sigma_2^2 - \mu_2^2) - \mu_1\mu_2)} \right) \right) \right\},$$

if a number of items currently in stock plus a number of items shipped is larger than $\mu_1$ times $\mu_2$, where the index I runs up to a number of items being equal to a number of items currently in stock plus a number of items shipped minus $\mu_1$ times $\mu_2$. Equation 6b is fairly hard to evaluate numerically. As a consequence, an amount of computer resources required to evaluate equation 6b and a calculation time can be substantial (in particular for large numbers of items and large numbers of locations).

As a consequence, the reallocation scheduling module 105 uses a modified benefit function adapted to be processed by a computer system in a more efficient manner. In general, the modified benefit function is adapted such that an objective function that has to be optimized to solve the reallocation scheduling problem is an integer quadratic programming problem. An example adaptation of the benefit function of FIG. 3 will now be discussed in connection with FIG. 4.

Figure 4:
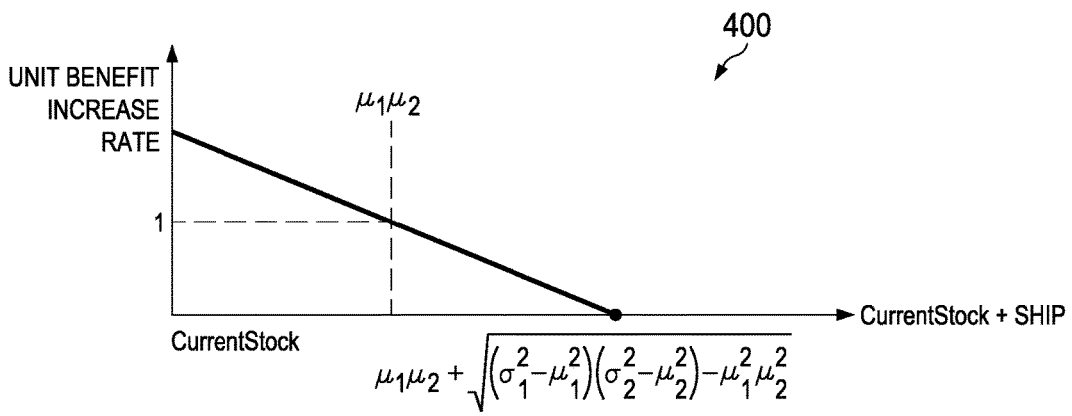
FIG. 4 illustrates an example graph indicating an increase rate of a benefit per unit particularly adapted for computerized processing.

FIG. 4 shows an example modified benefit increase rate per unit of a particular item at a particular location. As can be seen in FIG. 4, the benefit increase rate per unit, which is a complex non-linear function in FIG. 3, has been linearized. In general, the reallocation scheduling module 105 uses models in which the unit benefit increase rate drops linearly with increasing number of items (i.e., items currently in stock plus items to be shipped). In the example of FIG. 4, the linear function crosses the benefit increase rate per unit of FIG. 3 at a number of units corresponding to the average lead time times the average sales rate. Moreover, the linearized benefit increase rate per unit assumes the value zero at a number of units corresponding to the safety inventory level as calculated above. In other words, the linearized benefit increase rate per unit assumes the value zero at a number of units (in stock plus tone shipped) which exceeds the lead time times the average sales rate by an amount which depends on the deviations of the lead time and the sales rate. In other examples, the unit benefit increase rate of FIG. 3 can be linearized in different ways compared to the linearization of FIG. 4.

When calculated based on a linearized benefit increase rate per unit, the expression for the total benefit per unit assumes a much simpler form than in equation 6b above. As the total benefit per unit is determined by integrating the unit benefit increase rate, the total benefit per unit will be a quadratic function of the number of items for a linearly decreasing benefit increase rate per unit. This can greatly simplify the optimization process.

When using the linearized benefit increase rate per unit depicted in FIG. 4, the benefit per unit assumes the following form:

$$\text{Benefit} = \qquad \text{Equation (7)}$$

$$\frac{1}{2} * \text{Ship} * \text{Price} * \left( 1 - \frac{\text{CurrentStock} + \text{Ship} - \mu_1\mu_2}{\sqrt{(\sigma_1^2 - \mu_1^2)(\sigma_2^2 - \mu_2^2) - \mu_1\mu_2}} \right)$$

where the variable "Ship" denotes a number of items of a particular product to be shipped to a particular shop. In this expression, the variable "Ship" is the only decision variable, as the other variables ("Price" and "CurrentStock" and the average and deviation values of the lead time and the number of sales per time) cannot be controlled at a given time but rather are predetermined by past events. As can be seen in equation 7, the term is a quadratic expression in the decision variable "Ship."

In addition to the benefit function discussed above, the reallocation scheduling module 105 can use a cost function. For example, cost for transporting a particular number of units between two locations can be modeled as:

$$\text{Cost} = \text{UnitCost} * \text{Distance} * \text{NumTrans}, \qquad \text{Equation (8)}$$

where the variable "Cost" denotes the total cost for a transport of a particular number of units, the variable "UnitCost" denotes the cost per distance and per vehicle, the variable "Distance" denotes the distance between two locations, and the variable "NumTrans" denotes a number of vehicles required to transport items between the two locations. In the cost function of equation 8, the variable "NumTrans" is the only decision value (since a distance between tow shops is fixed and the variable "UnitCost" cannot be changed instantaneously at any given time).

Based on the benefit and cost functions discussed above, reallocation scheduling module 105 can formulate an objective function (or obtain the objective function from another source) to determine a reallocation scheme. In one example, the objective function is:

$$\Sigma_{i,j,k} \text{Benefit} - \text{Cost}, \qquad \text{Equation (9)}$$

where the summation runs over all start locations (index i), over all destination locations (index j), and over all products (index k). For instance, if the retail store chain of the present example has 100 stores and sells 10.000 products, the objective function has 100 million terms. Nevertheless, the reallocation scheduling module 105 can use the quadratic benefit function of equation 7 and the linear cost function of equation 8 and efficiently optimize the objective function.

Based on the benefit and cost functions discussed above, reallocation scheduling module 105 can maximize the following objective function:

$$\Sigma_{i,j,k} A[j,k] * \text{Ship}[i,j,k] - B[i,k] * \text{Ship}[i,j,k]^2 - C[i,j] * \text{NumTrans}[i,j]. \qquad \text{Equation (10)}$$

where A[j,k], B[j,k], and C[i,j] denote terms which do not include the decision variables. It should be pointed out again that the objective function is a quadratic function of the decision variables. In one example, the terms A[j,k], B[j,k], and C[i,j] depend on the parameters of the model discussed above as follows:

Equations (11)

$$A[j, k] = \text{Price}(j, k) * \frac{\sqrt{(\sigma_1^2[j] - \mu_1^2[j])(\sigma_2^2[j] - \mu_2^2[j]) - \mu_1[j]\mu_2[j]} - CurrentStock[j, k] + \mu\_1[j]\mu\_2[j]}{2\sqrt{(\sigma_1^2[j] - \mu_1^2[j])(\sigma_2^2[j] - \mu_2^2[j]) - \mu_1[j]\mu_2[j]}},$$

$$B[j, k] = \frac{\text{Price}[j, k]}{2\sqrt{(\sigma_1^2[j] - \mu_1^2[j])(\sigma_2^2[j] - \mu_2^2[j]) - \mu_1[j]\mu_2[j]}},$$

$$C[i, j] = UnitCost[i, j] * Distance[i, j].$$

As discussed above, the decision variables are the variable "Ship," which denotes a number of items for each type of item (index k) to be shipped from each start location (index i) to each of the other locations (index j) and variable "NumTrans" denotes a number of vehicles required to transport items between the two locations. However, in other examples, another set of decision variables can be employed. For instance, costs and benefits could be exclusively determined based on a number of items to ship between two locations (i.e., the variable "Ship" above).

In addition, the reallocation scheduling module 105 uses a set of constraints when optimizing the objective function. In one example, the set of constraints includes the following constraints:

$$\Sigma_i Ship[i,j,k] \leq ImpReq[j,k]. \quad \text{constraint 1:}$$

i.e., when the store i exports item k to the store j, the import amount for store j should not exceed its import requirement of item k.

$$\Sigma_j Ship[i,j,k] \leq ExpReq[j,k]. \quad \text{constraint 2:}$$

I.e., when the store i exports item k to the store j, the export amount of store i should not exceed its storage capability on item k.

$$\text{constraint 3: } NumOfTran[i, j] \geq \sum_k \frac{Ship[i, j, k]}{CapOfVeh}$$

I.e., when the store i exports a number of items to the store j, the number of vehicles should be sufficiently large.

In this manner, the optimization of the objective function of equation 10 becomes an integer quadratic programming problem. The reallocation scheme can be determined based on the values of the decision variables which optimize (e.g., maximize) the objective function for a particular set of parameters.

Figure 5:
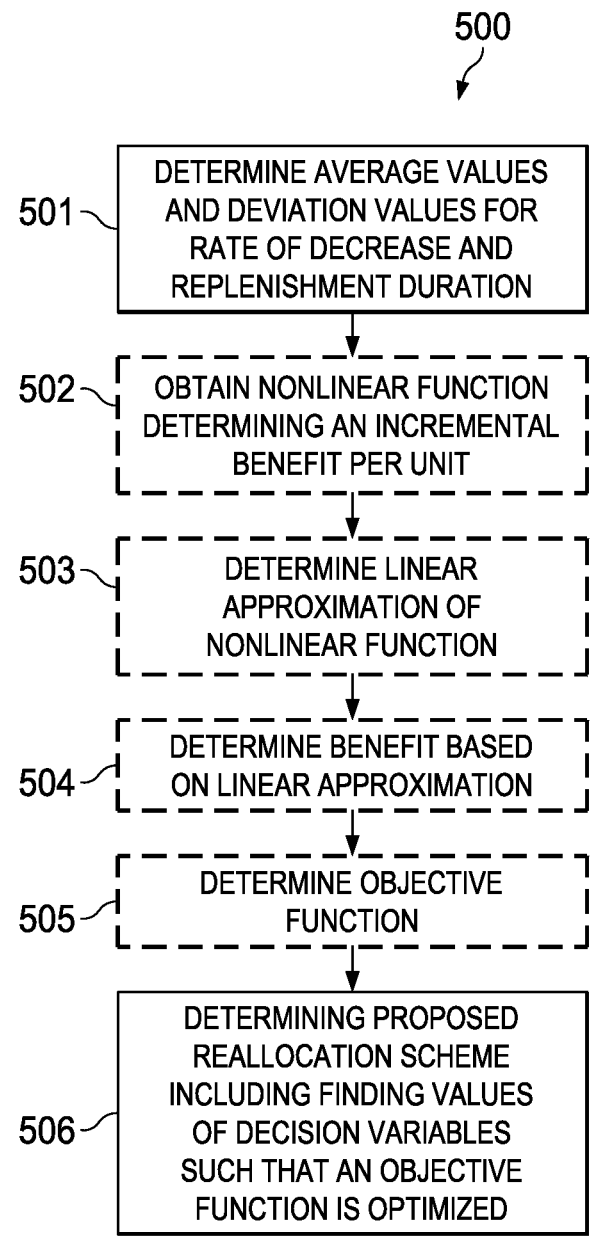
FIG. 5 illustrates an example method for computerized calculation of resource reallocation scheduling schemes.

FIG. 5 illustrates an example method for computerized calculation of resource reallocation scheduling schemes. At operation 501, average values and deviation values for rate of decrease and replenishment duration are determined. At operation 502, a non-linear function is obtained which determines an incremental benefit per unit. At operation 503, the non-linear function which determines an incremental benefit per unit is linearized. Based on this linearized function, a benefit function per unit is determined in operation 504. Operations 502 to 504 do not have to be carried out each time a resource reallocation scheduling scheme is to be determined. Rather, operations 502 to 504 describe the process for generating a benefit function which is particularly adapted to be processed efficiently by a computer. An operable computer system for determining a resource reallocation scheduling scheme (e.g., the reallocation scheduling module 105) can only be provided and use the adapted benefit function. The unit benefit function is used to determine an objective function for the resource reallocation scheduling scheme at operation 505. Steps 502 to 505 can be performed during an earlier modeling stage. At operation 506, a proposed reallocation scheme is determined by finding values for the decision variables which optimize the objective function.

In the previous sections, the computer system for the computerized calculation of resource reallocation scheduling schemes have been described as functional units. These functional units can be embodied in different hardware and software environments, as will be discussed in the subsequent sections.

At a high level, the computer system for the computerized calculation of resource reallocation scheduling schemes is associated with a computer or processor. A computer or processor comprises an electronic computing unit (e.g., a processor) operable to receive, transmit, process, store, or manage data and information associated with an operating environment of the database system. As used in the present disclosure, the term "computer" or "processor" is intended to encompass any suitable processing device. The term "processor" is to be understood as being a single processor that is configured to perform operations as defined by one or more aspects described in this disclosure, or the "processor" comprises two or more processors that are configured to perform the same operations (e.g., in a manner that the operations are distributed among the two or more processors). The processor may comprise multiple organic field-effect transistors or thin film transistors or a combination thereof. This may allow processing the operations in parallel by the two or more processors. The two or more processors may be arranged within a supercomputer, and the supercomputer may comprise multiple cores allowing for parallel processing of the operations. For instance, a computer or processor may be a desktop or a laptop computer, a cellular phone, a smartphone, a personal digital assistant, a tablet computer, an e-book reader, or a mobile player of media. Furthermore, the operating environment of the database system can be implemented using any number of servers, as well as computers other than servers, including a server pool. Indeed, the computer or processor and the server may be any computer or processing device such as, for example, a blade server, general-purpose personal computer (PC), Macintosh, workstation, UNIX-based workstation, or any other suitable device. In other words, the present disclosure contemplates computers other than general purpose computers, as well as computers without conventional operating systems. Further, the computer, processor, and server may be adapted to execute any operating system, including Linux, UNIX, Windows, Mac OS, iOS, Android, or any other suitable operating system.

The terms "computing device," "server," or "processor" encompass all kinds of apparatus, devices, and machines for processing data, including by way of example a programmable processor, a computer, a system on a chip, or multiple ones, or combinations of the foregoing. The apparatus can include special purpose logic circuitry, e.g., an FPGA (field programmable gate array), a CUDA (Compute Unified Device Architecture), or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and operating environment can realize various different computing model infrastructures. In enterprise systems, there are OLTP (OnLine Transaction processing) systems used to carry out business processes of a company where employees and other stakeholders, such as suppliers or customers, follow a business process which may result in business documents created in a database of the OLTP system. The database system can include in-memory databases in addition to the persistent databases described in connection with FIG. 1 and thereby exploit recent innovations in hardware to run a database in main memory. In an implementation of the present disclosure described herein, the servers may be types of a Java development platform, such as, e.g., Enterprise JavaBeans® (EJB), J2EE Connector Architecture (JCA), Java Messaging Service (JMS), Java Naming and Directory Interface (JNDI), and Java Database Connectivity (JDBC), a ByDesign platform, SuccessFactors Platform, ERP Suite technology or in-memory database such as High Performance Analytic Appliance (HANA) platform. In an aspect, the servers may be based on two different of the above-mentioned platforms.

Regardless of the particular implementation, "software" or "operations" may include computer-readable instructions, firmware, wired or programmed hardware, or any combination thereof on a tangible and non-transitory medium operable when executed to perform at least the processes and operations described herein. Indeed, each software component may be fully or partially written or described in any appropriate computer language including C, C++, Java, Visual Basic, assembler, Python and R, Perl, any suitable version of 4GL, as well as others.

The figures and accompanying description illustrate example processes and computer-implementable techniques. However, the database system operating environment (or its software or hardware components) contemplates using, implementing, or executing any suitable technique for performing these and other processes. It will be understood that these processes are for illustration purposes only and that the described or similar techniques may be performed at any appropriate time, including concurrently, individually, or in combination. In addition, many of the operations in these processes may take place simultaneously, concurrently, and/or in different orders or combinations than shown. Moreover, operating environment may use processes with additional operations, fewer operations, and/or different operations, so long as the methods remain appropriate.

Aspects of the subject matter and the operations described in this specification can be implemented in digital electronic circuitry, semiconductor circuits, analog circuits, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by or to control the operation of a data processing apparatus. Alternatively or in addition, the program instructions can be encoded on an artificially generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices). The operations described in this specification can be implemented as operations performed by a data processing apparatus on data stored on one or more computer-readable storage devices or received from other sources.

A computer program (also known as a program, software, software application, script, or code) or "user interface" can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The term "graphical user interface," or GUI, may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) "icons," some or all associated with a web browser, such as interactive fields, pull-down lists, and buttons operable by the user of the computing device hosting the UI. These and other UI icons may be related to or represent the functions of the web browser. The term "browser user interface" refers to a graphical user interface embedded in a web browser environment on the remote computing device. The browser user interface may be configured to initiate a request for a uniform resource locator (URL) and may be configured to display a retrieved web page such as an HTML coded web page. The browser user interface may comprise displayed or hidden icons which, upon activation, initiate an associated electronic process inside or outside the remote computing device. For example, the browser user interface may be Internet Explorer, Chrome, or Firefox. "Creating an icon" is to be understood as generating a new icon on the user interface. "Modifying an icon" is to be understood as changing a property of an existing icon on the user interface. "Deleting an icon" is to be understood as vanishing an existing icon on the user interface, e.g., for replacement by a newly created icon. "Updating the user interface" thereby is to be understood as creating, modifying, or deleting an icon on the user interface.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer or processor may be a processor for performing actions in accordance with instructions and one or more memory devices for storing instructions and data. Generally, a computer or processor will also include, or be operatively coupled to receive, data from or transfer data to, or both, one or more mass storage devices for storing data, e.g., magnetic, magneto optical disks, or optical disks. However, a computer or computing device need not have such devices. Moreover, a computer or computing device can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media, and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the user interface described in this specification can be implemented on a computer having a non-flexible or flexible screen, e.g., a CRT (cathode ray tube), LCD (liquid crystal display), or OLED (organic light emitting diode) monitor, for displaying information to the user and a keyboard and a pointer, e.g., a finger, a stylus, a mouse, or a trackball, by which the user can provide input to the computer. Other kinds of devices can be used to provide for interaction with a user as well; for example, feedback provided to the user can be any form of sensory feedback, e.g., touch feedback, visual feedback, auditory feedback, or tactile feedback; and input from the user can be received in any form, including acoustic, speech, touch, or tactile input. In addition, a computer or processor can interact with a user by sending documents to and receiving documents from a device that is used by the user; for example, by sending web pages to a web browser on a user's user device in response to requests received from the web browser.

Implementations of the subject matter described in this specification can be implemented in a computing system that includes a back-end component, e.g., as a server, or that includes a middleware component, e.g., an application server, or that includes a front-end component, e.g., a user computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some implementations, a server transmits data (e.g., an HTML page) to a user device (e.g., for purposes of displaying data to and receiving user input from a user interacting with the user device). Data generated at the user device (e.g., a result of the user interaction) can be received from the user device at the server.

While this specification contains many specific implementation details, these should not be construed as limitations on the scope of any implementation or on the scope of what may be claimed, but rather as descriptions of features that may be specific to particular implementations of particular implementations. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations, alterations, and permutations of the described implementations are within the scope of the following claims as will be apparent to those skilled in the art. For example, the operations recited in the claims can be performed in a different order and still achieve desirable results.

Accordingly, the above description of example implementations does not define or constrain this disclosure. Other changes, substitutions, and alterations are also possible without departing from the spirit and scope of this disclosure.

What is claimed is:

1. A computer system, comprising:
   at least one processor; and
   a non-transitory computer-readable storage medium coupled to the at least one processor, the storage medium storing a database including information regarding a current stock of each of one or more items in each of a plurality of locations, historical data regarding a rate of decrease of a stock of each of the items in each of the plurality of locations, and historical data regarding replenishments of a stock of each of the items in each of the plurality of locations, the storage medium further storing programming instructions for execution by the at least one processor, the programming instructions instructing the at least one processor to:
   determine average values and deviation values for the rate of decrease of the stock of each of the items in each of the plurality of locations and average values and deviation values for replenishment durations of the stock of each of the items in each of the plurality of locations;

obtain an objective function including one or more integer-valued decision variables, a first decision variable indicating a quantity of each of the one or more items to be transported between each of the plurality of locations, wherein one or more terms of the objective function include the first decision variable, the current stock of one or more items in the plurality of locations, and the average values and deviation values of the rate of decrease of the stock of the items in each of the plurality of locations and replenishment durations of the stock of each of the items in each of the plurality of locations, and wherein the objective function is a quadratic function with respect to the one or more decision variables;

obtain one or more constraints, wherein the one or more constraints are linear with respect to the one or more decision variables;

automatically determine a proposed reallocation scheme for each of the items between the plurality of locations based on the objective function, wherein determining the reallocation scheme includes finding values of one or more decision variables that optimize the objective function while obeying the one or more constraints, wherein determining a proposed reallocation scheme includes solving an integer quadratic programming problem; and automatically determine a required quantity of a particular item at a particular location based on the current stock of the particular item at the particular location and average values and deviation values for the rate of decrease of the stock of the particular item at the particular location and replenishment durations of the stock of the particular item at the particular location, wherein the required quantity of the particular item at the particular location is calculated as a minimum required quantity minus a current stock of the particular item, wherein the minimum required quantity is determined based on an average value of a rate of decrease of the stock of a first item at a second location multiplied with the replenishment duration of the stock of the first item at the second location plus an amount determined based on the deviation of the rate of decrease of the stock of the first item at the second location and a deviation of the replenishment duration of the stock of the first item at the second location; and implementing the determined proposed reallocation scheme for each of the items between the plurality of locations.

2. The computer system of claim 1, wherein the objective function includes a term quantifying a benefit of a transport of a first item of the one or more items from a first location of the plurality of locations to a second location of the plurality of locations, wherein the term quantifying a benefit is determined based on a linear approximation of a nonlinear function determining an incremental benefit per unit of the first item transported from the first location to the second location.

3. The computer system of claim 2, wherein the benefit is determined based on a cumulative value calculated based on the linear approximation of a nonlinear function determining an incremental benefit per unit of the first item transported from the first location to the second location.

4. The computer system of claim 2, wherein the nonlinear function determining an incremental benefit per unit of the first item includes a first section of constant incremental benefit per unit and a second section with a nonlinearly decreasing incremental benefit per unit.

5. The computer system of claim 4, wherein a boundary between the first section and the second section is determined based on an average value of a rate of decrease of a stock of the first item at the second location and based on a replenishment duration of the stock of the first item at the second location.

6. The computer system of claim 5, wherein the linear approximation includes approximating the nonlinear function by a linear function, wherein the linear function crosses the nonlinear function at the boundary between the first section and wherein the linear function yields an incremental benefit of zero for a predetermined number of transported items, the predetermined number of items being higher than an average value of the rate of decrease of the stock of the first item at the second location multiplied with the replenishment duration of the stock of the first item at the second location by a predetermined amount.

7. The computer system of claim 6, wherein the predetermined amount is determined based on the deviation of the a rate of decrease of the stock of the first item at the second location and a deviation of the replenishment duration of the stock of the first item at the second location.

8. The computer system of claim 2, wherein the objective function further includes a term quantifying a cost of a transport of the first item from the first location to the second location of the plurality of locations.

9. The computer system of claim 8, wherein the term quantifying the cost is determined based at least on a cost of transport per unit between the first location and the second location and a number of transport vehicles required to transport a particular number of first items from the first location to the second location.

10. The computer system of claim 1, wherein a first constraint of the one or more constraints is that a number of items of a first item transported from a first location of the plurality of locations to a second location of the plurality of locations shall not exceed a required quantity of the first item at the second location.

11. The computer system of claim 9, wherein a second constraint of the one or more constraints is that a number of items of a first item transported from a first location of the plurality of locations to a second location of the plurality of locations shall not exceed a capacity for the first item at the second location.

12. The computer system of claim 9, wherein a third constraint of the one or more constraints is that a number of vehicles required to transport a quantity of first items from a first location of the plurality of locations to a second location of the plurality of locations shall not exceed an available number of vehicles at the first location.

13. The computer system of claim 1, wherein determining average values and deviation values for the rate of decrease of the stock of each of the items in each of the plurality of locations and replenishment durations of the stock of each of the items in each of the plurality of locations includes approximating historical data regarding a rate of decrease of a stock of each of the items in each of the plurality of locations and historical data regarding replenishments of a stock of each of the items in each of the plurality of locations by normal distributions.

14. The computer system of claim 13, wherein the average values are arithmetic means and the deviation values are standard deviations.

15. The computer system of claim 1, wherein terms of the objective function are further determined based on a price of each of the items.

16. A computer-implemented method executed by at least one processor, the method comprising:

determining, by the at least one processor, average values and deviation values for a rate of decrease of a stock of each item of one or more items in each of a plurality of locations replenishment durations of the stock of each of the items in each of the plurality of locations;

obtaining, by the at least one processor, an objective function including one or more integer-valued decision variables, a first decision variable indicating a quantity of each of the one or more items to be transported between each of the plurality of locations, wherein one or more terms of the objective function include the first decision variable, a current stock of one or more items in the plurality of locations, and the average values and deviation values of the rate of decrease of the stock of the items in each of the plurality of locations and replenishment durations of the stock of each of the items in each of the plurality of locations, and wherein the objective function is a quadratic function with respect to the one or more decision variables;

obtaining, by the at least one processor, one or more constraints, wherein the one or more constraints are linear with respect to the one or more decision variables;

automatically determining, by the at least one processor, a proposed reallocation scheme for each of the items between the plurality of locations based on the objective function, wherein determining the reallocation scheme includes finding values of one or more decision variables that optimize the objective function while obeying the one or more constraints, wherein determining a proposed reallocation scheme includes solving an integer quadratic programming problem, and wherein the objective function includes a term quantifying a benefit of a transport of a first item of the one or more items from a first location of the plurality of locations to a second location of the plurality of locations, wherein the term quantifying a benefit is determined based on a linear approximation of a nonlinear function determining an incremental benefit per unit of the first item transported from the first location to the second location, wherein the nonlinear function determining the incremental benefit per unit of the first item includes a first section of constant incremental benefit per unit and a second section with a nonlinearly decreasing incremental benefit per unit, and wherein a boundary between the first section and the second section is determined based on an average value of a rate of decrease of a stock of the first item at the second location and based on a replenishment duration of the stock of the first item at the second location; and implementing the determined proposed reallocation scheme for each of the items between the plurality of locations.

17. A computer-readable medium storing instructions thereon which when executed by at least one processor cause the at least one processor to perform operations comprising:

determining, by the at least one processor, average values and deviation values for a rate of decrease of a stock of each item of one or more items in each of a plurality of locations replenishment durations of the stock of each of the items in each of the plurality of locations;

obtaining, by the at least one processor, an objective function including one or more integer-valued decision variables, a first decision variable indicating a quantity of each of the one or more items to be transported between each of the plurality of locations, wherein one or more terms of the objective function include the first decision variable, the current stock of one or more items in the plurality of locations, and the average values and deviation values of the rate of decrease of the stock of the items in each of the plurality of locations and replenishment durations of the stock of each of the items in each of the plurality of locations, and wherein the objective function is a quadratic function with respect to the one or more decision variables;

obtaining, by the at least one processor, one or more constraints, wherein the one or more constraints are linear with respect to the one or more decision variables;

automatically determining, by the at least one processor, a proposed reallocation scheme for each of the items between the plurality of locations based on the objective function, wherein determining the reallocation scheme includes finding values of one or more decision variables that optimize the objective function while obeying the one or more constraints, wherein determining a proposed reallocation scheme includes solving an integer quadratic programming problem; and automatically determining, by the at least one processor, a required quantity of a particular item at a particular location based on a current stock of the particular item at the particular location and average values and deviation values for the rate of decrease of the stock of the particular item at the particular location and replenishment durations of the stock of the particular item at the particular location, wherein the required quantity of the particular item at the particular location is calculated as a minimum required quantity minus a current stock of the particular item, wherein the minimum required quantity is determined based on an average value of a rate of decrease of the stock of a first item at a second location multiplied with the replenishment duration of the stock of the first item at the second location plus an amount which is determined based on the deviation of the rate of decrease of the stock of the first item at the second location and a deviation of the replenishment duration of the stock of the first item at the second location; and implementing the determined proposed reallocation scheme for each of the items between the plurality of locations.

* * * * *